(12) United States Patent
Sakuma

(10) Patent No.: US 10,377,418 B2
(45) Date of Patent: Aug. 13, 2019

(54) SUSPENSION MEMBER FOR VEHICLE

(71) Applicant: TOYOTA JIDOSHA KABUSHIKI KAISHA, Toyota-shi, Aichi-ken (JP)

(72) Inventor: Hitoshi Sakuma, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 158 days.

(21) Appl. No.: 15/408,884

(22) Filed: Jan. 18, 2017

(65) Prior Publication Data

US 2017/0210418 A1 Jul. 27, 2017

(30) Foreign Application Priority Data

Jan. 21, 2016 (JP) ................... 2016-009430

(51) Int. Cl.
*B62D 7/18* (2006.01)
*B29C 70/08* (2006.01)
*B29C 65/00* (2006.01)
*B29K 307/04* (2006.01)

(52) U.S. Cl.
CPC .......... *B62D 7/18* (2013.01); *B29C 66/72141* (2013.01); *B29C 70/081* (2013.01); *B29K 2307/04* (2013.01); *B60G 2206/013* (2013.01); *B60G 2206/50* (2013.01); *B60G 2206/7101* (2013.01); *B60Y 2304/03* (2013.01)

(58) Field of Classification Search
CPC ................. B62D 7/18; B60G 2206/50; B60G 2206/7101; B60G 2206/013; B60G 7/001; B60Y 2304/03; B29C 70/081; B29C 70/02; B29C 70/22; B29C 70/222; B29C 70/08; B29C 66/72141; B29C 66/72143; B29C 66/7214; B29C 66/7212; B29C 66/71; B29K 2307/04; B32B 5/12; B32B 2262/106; Y10T 428/249945
USPC ...................................................... 280/93.512
See application file for complete search history.

(56) References Cited

U.S. PATENT DOCUMENTS

| 4,650,620 A | 3/1987 | Owen et al. |
| 4,772,044 A * | 9/1988 | Booher ................... B29C 70/52 267/149 |
| 10,059,078 B2 * | 8/2018 | Carson, Jr. ............ B29C 66/547 |

(Continued)

FOREIGN PATENT DOCUMENTS

| CN | 203641384 U | 6/2014 |
| DE | 200 06 316 U1 | 9/2001 |

(Continued)

*Primary Examiner* — Keith J Frisby
(74) *Attorney, Agent, or Firm* — Sughrue Mion, PLLC

(57) ABSTRACT

An overall knuckle is formed by a second carbon-fiber composite material, and a first carbon-fiber composite material is embedded in particular portions, whose rigidities are insufficient only with the second carbon-fiber composite material. The one particular portion is provided to a neck part, and the first carbon-fiber composite material is embedded in this particular portion such that continuous fibers thereof are orientated in a direction orthogonal to a central axis of a torsional load so as to enhance a torsional rigidity. The other particular portions are provided to the body part, and the first carbon-fiber composite material is embedded in these particular portions such that the continuous fibers thereof are orientated in a vertical direction so as to enhance a bending rigidity.

1 Claim, 8 Drawing Sheets

(56) References Cited

U.S. PATENT DOCUMENTS

| | | |
|---|---|---|
| 2013/0313862 A1 | 11/2013 | Yamaji et al. |
| 2014/0127521 A1 | 5/2014 | Ishibashi et al. |
| 2015/0050453 A1 | 2/2015 | Carson et al. |
| 2015/0151605 A1 | 6/2015 | Kuroda |
| 2015/0158361 A1 | 6/2015 | Eismann et al. |
| 2015/0266245 A1 | 9/2015 | Ike |
| 2016/0229247 A1* | 8/2016 | Kuroda ................. B60G 7/001 |
| 2016/0257335 A1 | 9/2016 | Dieudonne et al. |

FOREIGN PATENT DOCUMENTS

| | | |
|---|---|---|
| JP | 62066912 A | 3/1987 |
| JP | 6335987 A | 12/1994 |
| JP | 2014000855 A | 1/2014 |
| JP | 2014524867 A | 9/2014 |
| JP | 2015-093476 A | 5/2015 |
| JP | 2015178241 A | 10/2015 |
| WO | 2012/137554 A1 | 2/2012 |
| WO | 2012/105716 A1 | 8/2012 |
| WO | 2015052415 A1 | 4/2015 |
| WO | 2015/106990 A1 | 7/2015 |
| WO | 2017/153109 A1 | 9/2017 |

* cited by examiner

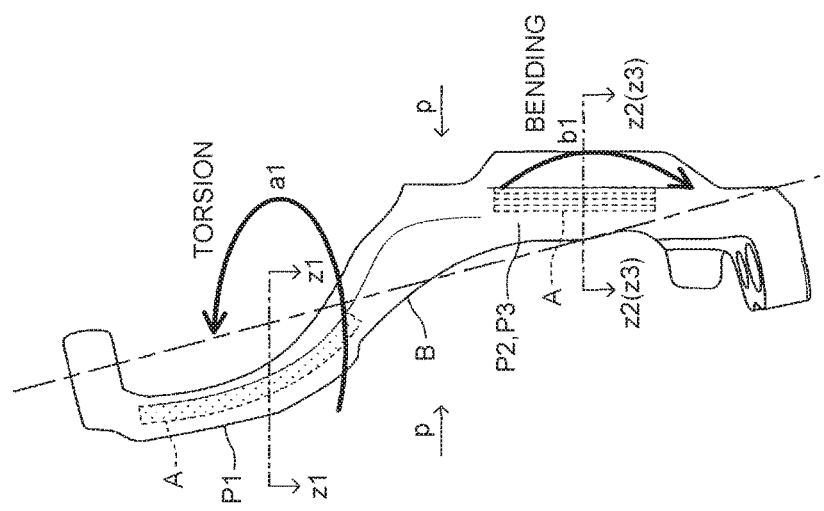
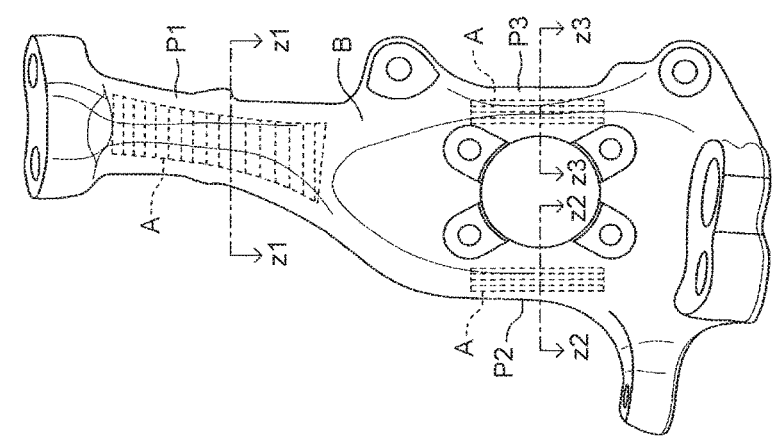

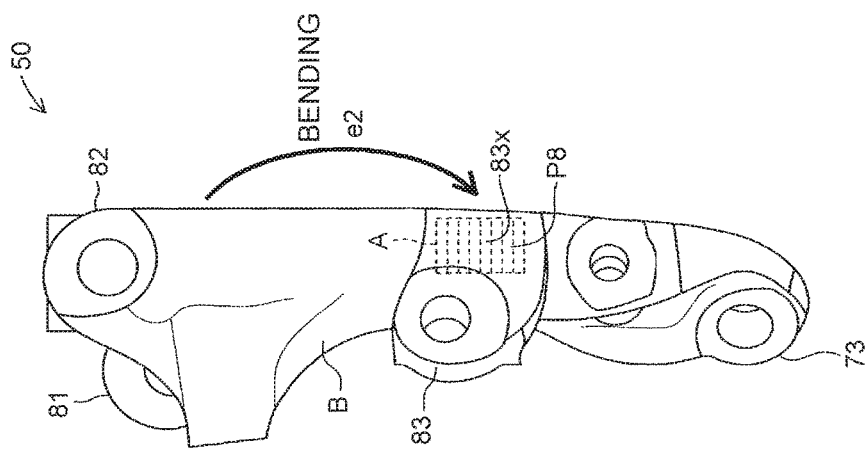
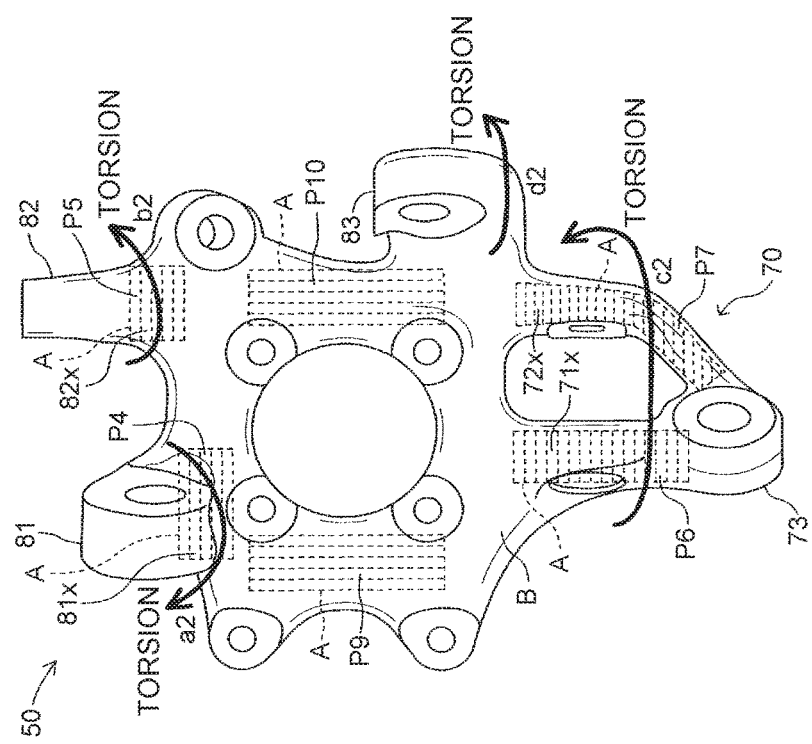

SUSPENSION MEMBER FOR VEHICLE

INCORPORATION BY REFERENCE

The disclosure of Japanese Patent Application No. 2016-009430 filed on Jan. 21, 2016 including the specification, drawings and abstract is incorporated herein by reference in its entirety.

BACKGROUND

1. Technical Field

The present disclosure relates to a suspension member for a vehicle used in a suspension that suspends a wheel relative to a vehicle body.

2. Description of Related Art

A suspension member for a vehicle is provided between a wheel and a vehicle body, and thus various loads, such as a load inputted from a road surface via the wheel, a load inputted from the vehicle body, and a load inputted from a steering mechanism, act on this suspension member. Hence, the suspension member is required to have an appropriate rigidity against such loads. For example, as an example of such a suspension member, there has been known a front knuckle (hereinafter, referred to as a knuckle). FIG. 9A is a front view of a knuckle 100, and FIG. 9B is a side view of the knuckle 100. The knuckle 100 includes a body part 110 having a circular hole 111 into which a hub bearing is installed formed by piercing the body part 110, and a neck part 120 so formed to integrally extend upward from the body part 110. An upper end of the neck part 120 is coupled to the vehicle body via an upper arm. A lower-end center 150 of the body part 110 is coupled to the vehicle body via a lower arm, and one lower end 170 of the body part 110 is coupled to a steering mechanism via a tie rod. The knuckle 100 is made of metal, such as iron and aluminum, and is produced by forging or casting. In FIG. 9, members coupled to the knuckle 100 are not illustrated.

A load in a torsional direction acts on the neck part 120 of the knuckle 100 as indicated by an arrow a of FIG. 9B, and a load in a bending direction acts on the body part 110 as indicated by an arrow b of FIG. 9A. In the knuckle 100 of related art, rigidity against the load in the torsional direction and rigidity against the load in the bending direction are secured by a sectional shape of the knuckle 100. If a product is produced by using an isotropic material, a torsional rigidity $k_T$ in a portion having a rectangular section (long side x, short side y) as shown in FIG. 10 is represented by the following formula, for example.

$$k_T = G \times k \times x \times y^3$$

where G represents a modulus of longitudinal elasticity, and k represents a coefficient, (x>y).

Accordingly, in order to enhance the torsional rigidity, it is optimum to increase a dimension of the short side y as shown in FIG. 10B. If there is any restriction on increasing in dimension of the short side y, it is also possible to enhance the torsional rigidity by increasing the dimension of the long side x; but in this case, increase in mass becomes too great, which is not unfavorable.

In light of limitation of space, the suspension member has restriction on its shape in order to avoid interference with other components. For example, as shown in FIG. 9B, a shock absorber S is disposed inward of the knuckle 100 (inward in the vehicle-width direction), and a tire T is disposed outward of the knuckle 100 (outward in the vehicle-width direction). Consequently, it is restricted to increase a thickness of the knuckle 100 in the vehicle-width direction. Hence, it is difficult to efficiently enhance the rigidity by the sectional shape of the knuckle 100, and increase in mass is likely to be caused.

Meanwhile, for example, in International Publication No. 2012/137554, there is proposed an automobile component produced by using a carbon fiber composite material. The composite material proposed in WO 2012/137554 A is a structural material formed by joining a unidirectional composite material in which reinforced fibers are orientated in one direction and a random composite material in which reinforced fibers are randomly orientated to each other.

SUMMARY

In a suspension member, each portion has a different direction in which rigidity acts on this portion. Specifically, even in a single suspension member, a direction in which a load is applied varies depending on each portion in the suspension member. For example, in the knuckle 100, a torsional load acts on the neck part 120 in the arrow a direction, and a bending load acts on the body part 110 in the arrow b direction. Consequently, even if the technique proposed in WO 2012/137554 A is applied, it is difficult to enhance the rigidity through the entire suspension member in well balance.

The present disclosure secures rigidity through an entire suspension member for a vehicle while minimizing increase in mass.

As example aspect of the present disclosure of a suspension member for a vehicle, the suspension member includes a first carbon-fiber composite material including continuous fibers, an orientation of the continuous fibers being oriented in one direction and a second carbon-fiber composite material including discontinuous fibers, an orientation of the discontinuous fibers being oriented in random directions, the suspension member integrally configured by the first carbon-fiber composite material and the second carbon-fiber composite material, the first carbon-fiber composite material being embedded in at least two different portions of the second carbon-fiber composite material such that the orientation of the continuous fibers in the at least two different portions are different from each other.

The suspension member for a vehicle of the present disclosure is integrally formed by the unidirectional carbon-fiber composite material and the random carbon-fiber composite material. An overall shape of the suspension member is formed by the random carbon-fiber composite material, and the unidirectional carbon-fiber composite material is embedded in the multiple portions in the random carbon-fiber composite material. Each composite material is formed by impregnating the carbon fibers as reinforcement fibers with resin. The random carbon-fiber composite material is formed such that the carbon fibers are arranged in random directions by using carbon fibers made of discontinuous fibers, and thus mechanical properties thereof become isotropic. Accordingly, in the suspension member, it is possible to secure a predetermined rigidity as a whole by using this random carbon-fiber composite material.

However, great partial loads act on the suspension member. In addition, a direction in which this load acts varies depending on each portion of the suspension member. If the suspension member is produced by only using the random carbon-fiber composite material, in order to secure rigidity against such a great load partially acting, a sectional area of the suspension member is required to be increased, which is not preferable.

To cope with this, in the present disclosure, the unidirectional carbon-fiber composite material is embedded in the multiple portions of the random carbon-fiber composite material, and the unidirectional carbon-fiber composite material in at least two of these multiple portions is arranged such that the orientation of the carbon fibers formed of the continuous fibers are different between the two portions. The unidirectional carbon-fiber composite material is formed by orderly arranging the carbon fibers made of continuous fibers in one direction; thus mechanical properties thereof become isotropic. Hence, if the suspension member has multiple portions whose rigidities are required to be enhanced, and directions in which rigidities are desired to be enhanced are different between at least two of these multiple portions, the unidirectional carbon-fiber composite material is embedded in each portion such that the carbon fibers made of continuous fibers are orientated in a direction defined by a direction in which the rigidity is desired to be enhanced, thereby appropriately enhancing the rigidity in each portion. Consequently, according to the present disclosure, for example, the rigidity, such as the bending rigidity and the torsional rigidity, can be flexibly adjusted depending on each portion; therefore, it is possible to secure an overall rigidity of the suspension member for the vehicle while minimizing increase in mass.

The suspension member may be a knuckle, the knuckle may be assembled to the vehicle such that the knuckle rotatably supports a steered wheel of the vehicle, the knuckle may include a body part provided with a circular hole in which a hub bearing is installed, the circular hole disposed at a center portion of the body part and a neck part integrally extending upward from the body part, an upper end of the neck part being coupled to another suspension member, the first carbon-fiber composite material may be provided to the neck part and the body part such that i) the orientation of the continuous fibers of the first carbon-fiber composite material provided to the body part is a vertical direction in a state in which the knuckle is assembled to the vehicle, and ii) the orientation of the continuous fibers of the first carbon-fiber composite material provided to the neck part is a direction orthogonal to the vertical direction.

A tie rod used for steering the steered wheel is coupled to the knuckle so as to steer the steered wheel in accordance with a movement of the tie rod. At this time, a torsional load acts on the neck part. In addition, a torsional load also acts on the neck part due to a force that is an input from a road surface and works to change the direction of the steered wheel. Hence, it is necessary to enhance the torsional rigidity of the neck part. To cope with this, in the one aspect of the present disclosure, the unidirectional carbon-fiber composite material is embedded in the neck part in such a manner that the carbon fibers thereof are orientated to a direction orthogonal to the vertical direction. Accordingly, it is possible to enhance the torsional rigidity in the neck part. It should be noted that the directions used in the present specification denote directions in a state in which the suspension member is assembled to the vehicle.

A lateral load in a vehicle-width direction acts on the steered wheel due to the input from a road surface. Hence, a portion lower than the center of the circular hole of the body part is pushed inward or outward in the vehicle-width direction. Consequently, the bending load in the vehicle-width direction acts on the body part. The circular hole is formed at the center of the body part, and thus the bending load acts on the body part at a vehicle-frontward portion or a vehicle-rearward portion thereof from the circular hole. To cope with this, in the one aspect of the present disclosure, the unidirectional carbon-fiber composite material is embedded in the body part such that the carbon fibers thereof are orientated in the vertical direction. Accordingly, it is possible to enhance the bending rigidity of the body part.

The suspension member may be a carrier, the carrier may be assembled to the vehicle such that the carrier rotatably supports a non-steered wheel of the vehicle, the carrier may include a body part provided with a circular hole in which a hub bearing is installed, the circular hole disposed at a center portion of the body part, and multiple coupling portions integrally extending from the body part, the multiple coupling portions being coupled to other suspension members, the multiple coupling portions include base portions that integrally extend from the body part, and the first carbon-fiber composite material is provided to the body part and at least one of the base portions such that i) the orientation of the carbon fibers in the first carbon-fiber composite material provided to the body part is a vertical direction in a state in which the carrier is assembled to the vehicle, and ii) the orientation of the carbon fibers in the first carbon-fiber composite material provided to the at least one of the base portions in the coupling portions is a direction different from the vertical direction.

A lateral load in a vehicle-width direction acts on the non-steered wheel due to an input from a road surface. Hence, the bending load acts on the body part in the vehicle-width direction. To cope with this, in the one aspect of the present disclosure, the unidirectional carbon-fiber composite material is embedded in the body part such that the carbon fibers thereof are orientated to the vertical direction. Accordingly, it is possible to enhance the bending rigidity of the body part.

In the carrier, a torsional load acts on the base portion that is a base portion of each coupling portion integrally extending from the body part due to an input from another suspension member. Hence, the torsional rigidity of the base portion of each coupling portion is required to be enhanced. A direction in which the torsional load acts on the base portion of each coupling portion varies among the respective coupling portions, so that the direction of the torsional load does not always coincide with the direction of the bending load acting on the body part. To cope with this, in the one aspect of the present disclosure, the direction of the carbon fibers of the unidirectional carbon-fiber composite material that is provided to at least one of the base portions of the coupling portions is orientated to a direction different from the vertical direction. Accordingly, it is possible to enhance the torsional rigidity of each coupling portion depending on the direction of the torsional load acting on the base portion of each coupling portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a front view explaining loads acting on the knuckle;

FIG. 5B is a side view explaining loads acting on the knuckle;

FIG. 8A is a front view of the carrier explaining loads acting on the carrier;

FIG. 8B is a side view of the carrier explaining a load acting on the carrier;

DETAILED DESCRIPTION OF EMBODIMENTS

Figure 1A:
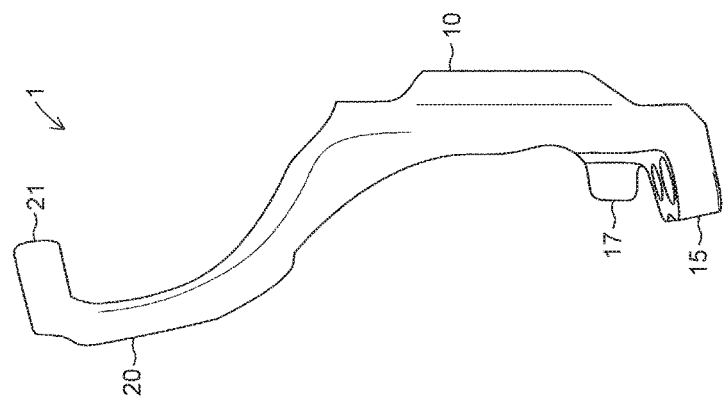
FIG. 1A is a front view of a knuckle according to a first embodiment.
Figure 1B:
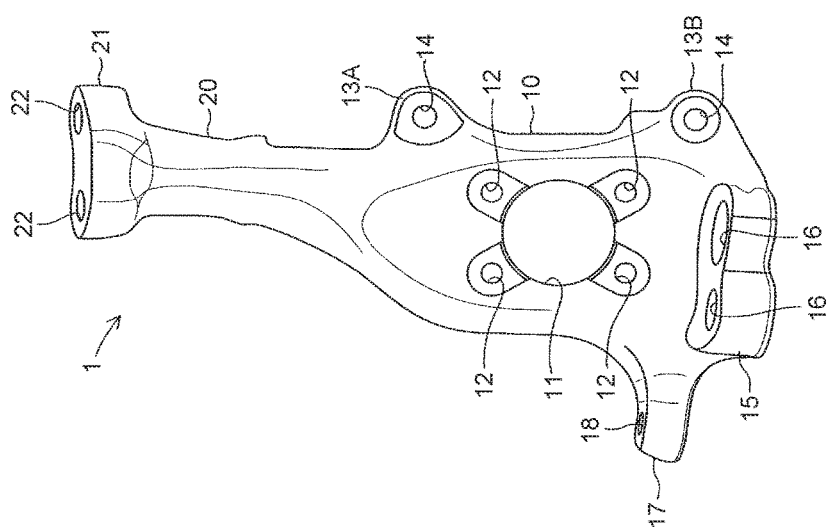
FIG. 1B is a side view of the knuckle according to the first embodiment.

A suspension member for a vehicle according to one embodiment of the present disclosure will be described with reference to drawings, hereinafter. FIG. 1 shows a front knuckle 1 (referred to as a knuckle, hereinafter) that is one of suspension members for a vehicle. FIG. 1A is a front view of the front knuckle 1, and FIG. 1B is a side view of the front knuckle 1. Herein, in a state in which the front knuckle 1 is assembled to the vehicle, an inner side surface in a vehicle-width direction is defined to be a front view. Hence, a front wheel is disposed on the right of FIG. 1B.

The knuckle 1 is a member assembled to the vehicle body in a manner as to rotatably support a steered wheel of the vehicle, and includes a body part 10 rotatably supporting a front wheel that is the steered wheel, and a neck part 20 formed in a bar shape integrally extending upward from the body part 10. Hereinafter, members coupled to the knuckle 1 will also be described, but these members are not illustrated in the drawings.

The body part 10 is formed to have a circular hole 11 with a large diameter extending through a center portion of the body part 10. Around the circular hole 11, there are formed two bearing fastening holes 12 at an upper position and two bearing fastening holes 12 at a lower position from the circular hole 11, respectively. A not-illustrated hub bearing is installed in the circular hole 11, and not-illustrated bearing-fixing bolts are inserted through the bearing fastening holes 12 to be fastened, thereby installing the not-illustrated hub bearing in the circular hole 11. Through this configuration, the body part 10 rotatably supports an axle hub inserted through the circular hole 11 via the hub bearing.

In side portions of the body part 10, there are formed caliper-fixing portions 13A, 13B used for fixing a not-illustrated brake caliper. A caliper-fixing hole 14 is formed to extend through each of the caliper-fixing portions 13A, 13B, and respective not-illustrated caliper-fixing bolts are inserted through the caliper-fixing holes 14 so as to fix the brake caliper to the knuckle 1.

A lower-arm coupling portion 15 extending inward in a vehicle-width direction, and a tie-rod coupling portion 17 extending in a vehicle-frontward direction are integrally formed with a lower portion of the body part 10, respectively. Two lower-arm coupling holes 16 are so formed as to extend through the lower-arm coupling portion 15, and a not-illustrated lower arm is coupled to the lower-arm coupling portion 15 via not-illustrated coupling members, such as ball joints, inserted through the respective lower-arm coupling holes 16. A tie-rod coupling hole 18 is so formed as to extend through the tie-rod coupling portion 17, and a not-illustrated tie rod is coupled to the tie-rod coupling portion 17 via a not-illustrated coupling member, such as a ball joint, inserted through the tie-rod coupling hole 18.

The neck part 20 is formed into a bar shape upwardly extending in a vehicle-width inward direction from the body part 10. An upper-arm coupling portion 21 extending in a vehicle-width outward direction is integrally formed with a front end of the neck part 20. Two upper-arm coupling holes 22 are so formed as to extend through the upper-arm coupling portion 21, and a not-illustrated upper arm is coupled to the upper-arm coupling portion 21 via not-illustrated coupling members, such as ball joints, inserted through the upper-arm coupling holes 22.

Accordingly, while rotatably supporting the axel hub, the knuckle 1 is swingably coupled to the vehicle body by the upper arm and the lower arm, and is also coupled to a not-illustrated steering mechanism by the tie rod. In this manner, the knuckle 1 supports the steered wheel in a rotatable manner, in a swingable manner relative to the vehicle body, and in a steerable manner.

A knuckle of related art is formed of metal, such as iron and aluminum, but the knuckle 1 of the present embodiment is integrally formed by using a carbon-fiber composite material made by hardening carbon fibers with resin. The knuckle 1 is formed by using two types of carbon-fiber composite materials having different carbon fiber forms. One of the two types is a unidirectional carbon-fiber composite material A (a first carbon-fiber composite material) formed by orderly arranging carbon fibers made of continuous fibers in one direction; and the other thereof is a random carbon-fiber composite material B (a second carbon-fiber composite material) formed by arranging carbon fibers made of discontinuous fibers in random directions. Respective matrixes (parent materials) of the unidirectional carbon-fiber composite material A and the random carbon-fiber composite material B are formed by using materials having common heat characteristics, and these materials may be thermoplastics resins such as a polyamide resin, for example, or may be thermosetting resins such as an epoxy resin, for example.

The continuous fibers used for the unidirectional carbon-fiber composite material A are carbon fibers that are continuous from one end to the other end opposite to the one end of the composite material. The discontinuous fibers used for the random carbon-fiber composite material B are long fibers cut into an average length of 10 to 100 mm, for example.

Figure 2A:
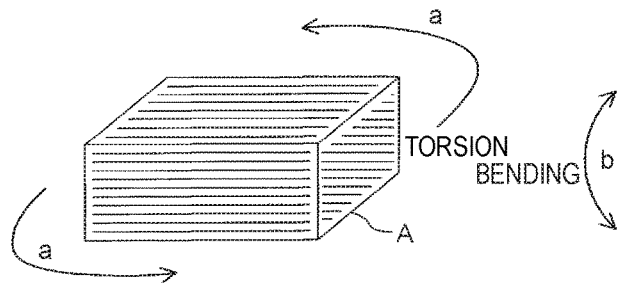
FIG. 2A is a drawing explaining anisotropy in a unidirectional carbon-fiber composite material.
Figure 2B:
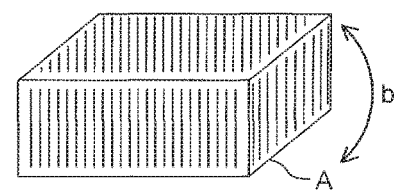
FIG. 2B is a drawing explaining the anisotropy in the unidirectional carbon-fiber composite material.

The unidirectional carbon-fiber composite material A is an anisotropy material having an anisotropic mechanical property. For example, as shown in FIG. 2A, if the carbon fibers of continuous fibers are orientated in the lateral direction, the unidirectional carbon-fiber composite material A exhibits a greater rigidity against a torsional load acting in the arrow a direction, but exhibits a smaller rigidity against a bending load acting in the arrow b direction as shown in FIG. 2B. As shown in FIG. 2B, if the carbon fibers of continuous fibers are orientated in the vertical direction, the unidirectional carbon-fiber composite material A exhibits a smaller rigidity against the torsional load acting in the arrow a direction, but exhibits a greater rigidity against the bending load acting in the arrow b direction.

Figure 3:
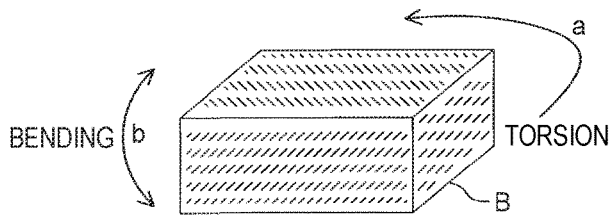
FIG. 3 is a drawing explaining isotropy in a random carbon-fiber composite material.

On the other hand, the random carbon-fiber composite material B is an isotropic material having an isotropic mechanical property. Hence, for example, as shown in FIG. 3, the random carbon-fiber composite material B exhibits an appropriate rigidity both against the torsional load acting in the arrow a direction and the bending load acting in the arrow b direction.

Based on the above mechanical property, the overall knuckle 1 is formed by using the random carbon-fiber composite material B, and the unidirectional carbon-fiber composite material A is partially embedded in portions in each of which rigidity becomes insufficient, that is, portions in each of which rigidity is desired to be enhanced, in consideration of directions in which the loads act. The portions having insufficient rigidities are referred to as particular portions, hereinafter.

Figure 4A:
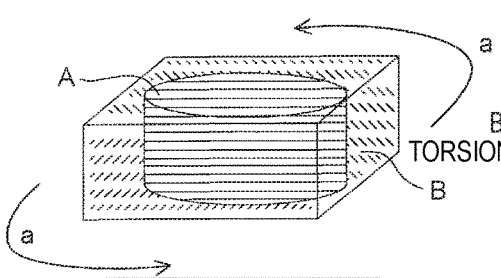
FIG. 4A is a drawing explaining rigidity in a combination of the unidirectional carbon-fiber composite material and the random carbon-fiber composite material.
Figure 4B:
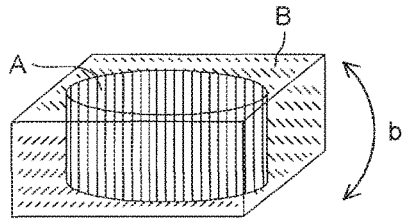
FIG. 4B is a drawing explaining rigidity in a combination of the unidirectional carbon-fiber composite material and the random carbon-fiber composite material.

For example, as shown in FIG. 4A, in each portion on which a greater torsional load acts in the arrow a direction, the unidirectional carbon-fiber composite material A is embedded in the random carbon-fiber composite material B such that a direction of the continuous fibers of the unidirectional carbon-fiber composite material A is orientated in a direction where the rigidity against the torsional load becomes greater, that is, in a direction orthogonal to a central axis of the torsional load, thereby enhancing the torsional rigidity. As shown in FIG. 4B, in each portion on which a greater bending load acts in an arrow b direction, the unidirectional carbon-fiber composite material A is embedded in the random carbon-fiber composite material B such that a direction of the continuous fibers of the unidirectional carbon-fiber composite material A is orientated in a direction where the rigidity against the bending load becomes greater, that is, in a vertical direction that is a direction parallel with a neutral line of the bending, thereby enhancing the bending rigidity.

The knuckle 1 steers the steered wheel in accordance with a movement of the tie rod by a driver's steering operation. At this time, a torsional load acts on the neck part 20 in an arrow a1 direction in FIG. 5B. Similarly, a torsional load also acts on the neck part 20 due to a force that is an input from a road surface and works to change a direction of the steered wheel. Hence, it is necessary to enhance the torsional rigidity of the neck part 20.

Furthermore, a lateral load acts on the wheel from the road surface in the vehicle-width direction (right and left direction in FIG. 5B), and this load is inputted into the knuckle 1 via the axel hub. In this case, a portion of the body part 10 located more downward than the center of the circular hole 11 is pushed inward or outward in the vehicle-width direction. Consequently, the bending load acts on the body part 10 in an arrow b1 direction in FIG. 5B. Hence, in the body part 10, the bending rigidity is required to be enhanced in portions thereof located more vehicle-frontward and more vehicle-rearward than the circular hole 11.

To cope with this, as shown in FIG. 5, in the neck part 20 and the body part 10 of the knuckle 1, there are set particular portions P1, P2, P3 in each of which the rigidity is desired to be enhanced, and the unidirectional carbon-fiber composite material A is embedded in the particular portions P1, P2, P3. In the particular portion P1 set in the neck part 20, the unidirectional carbon-fiber composite material A is embedded such that the continuous fibers thereof are orientated in the direction substantially orthogonal to the central axis of the torsional load. The central axis of the torsional load referred to in the present specification denotes a direction in which a screw advances if the torsional load acts on this screw. In the present embodiment, the continuous fibers are orientated toward in the right and left direction in FIG. 5A, that is, in the vehicle longitudinal direction. Hence, a section in the particular portion P1 (a section along line z1-z1 in FIG. 5A) is represented by an image of FIG. 4A.

The particular portion P2 and the particular portion P3 are set at a more vehicle-frontward position and at a more vehicle-rearward position of body part 10 than the circular hole 11. The unidirectional carbon-fiber composite material A in which the continuous fibers are orientated in the vertical direction is embedded in the particular portion P2 and in the particular portion P3. Hence, respective sections of the particular portions P2, P3 (a section along line z2-z2 and a section along line z3-z3 in FIG. 5A) are represented by an image of FIG. 4B, respectively.

The knuckle 1 is formed by using a mat (which is commonly known as a so-called "random mat"; therefore, referred to as a random mat, hereinafter) that is a base material used for producing the random carbon-fiber composite material B, and a sheet (which is commonly known as a so-called "uni directional sheet (UD sheet)"; therefore, referred to as a UD sheet, hereinafter) that is a base material used for producing the unidirectional carbon-fiber composite material A. In this case, there is prepared a laminated body formed by laminating a plurality of random mats, and interposing a UD sheet between the random mats at a position to become each particular portion. Interposing of the UD sheet between the random mats may be carried out by laminating a plurality of UD sheets, by winding the UD sheet in a roll shape, or in combination of them so as to secure a predetermined thickness. An orientation of each UD sheet is set such that the continuous fibers thereof are orientated in the aforementioned direction.

This laminated body is disposed between an upper die and a lower die that are heated, and is pressurized (hot-pressed) by the upper and lower dies in a laminating direction, thereby forming a matrix (overall shape) of the knuckle 1. In this case, the pressurizing direction may be set to be an arrow p direction in FIG. 5B. The matrix is formed as an integral body in such a manner that the overall matrix is formed by using the random carbon-fiber composite material B, and the unidirectional carbon-fiber composite material A is embedded in the particular portions P1, P2, P3 of the matrix. The knuckle 1 is finished after a hole-boring process, a cutting process, and others are appropriately carried out.

Even if the knuckle 1 as the aforementioned suspension member of the first embodiment has multiple particular portions whose rigidities are required to be enhanced, and directions in which the rigidities are desired to be enhanced are different from one another, the unidirectional carbon-fiber composite material A is embedded in these particular portions such that continuous fibers thereof are orientated in consideration of the respective directions in which the rigidities of these particular portions are desired to be enhanced. Accordingly, the rigidity can be enhanced in well balance through the entire knuckle 1. It is unnecessary to secure the rigidity by a sectional shape of the knuckle 1 made of a metallic material, as it is necessary in the related art; therefore, it is possible to attain reduction in space and reduction in weight. Accordingly, freedom of designing is promoted.

Figure 6A:
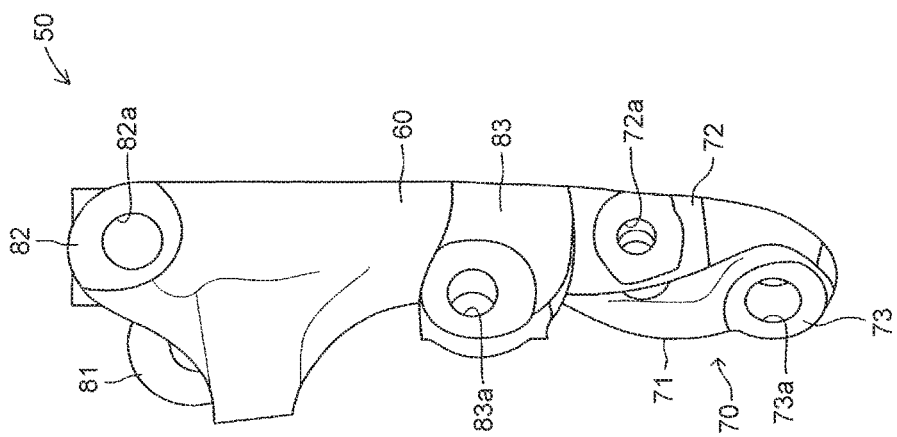
FIG. 6A is a front view of a carrier according to a second embodiment.
Figure 6B:
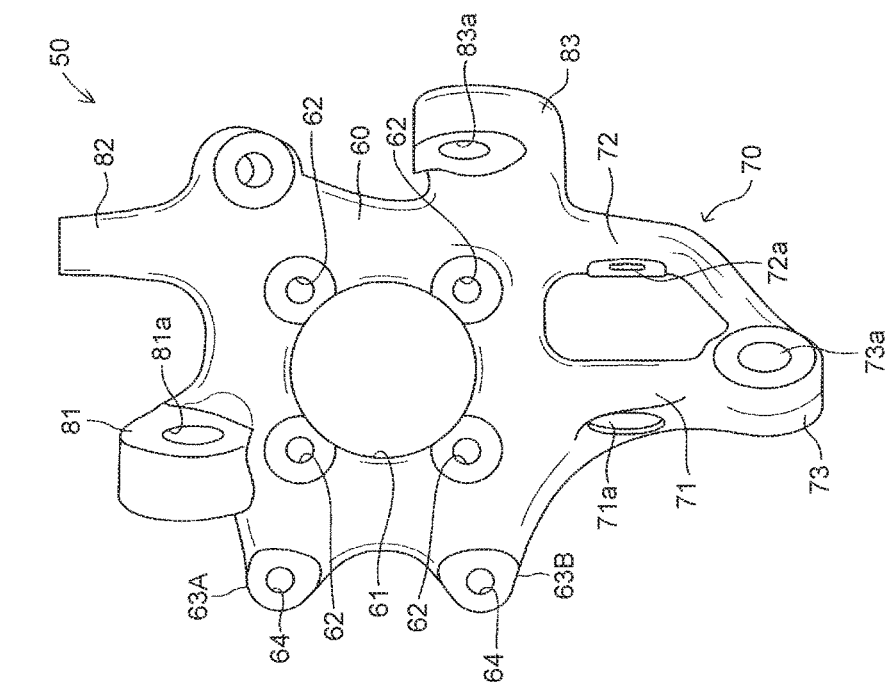
FIG. 6B is a side view of the carrier according to the second embodiment.

The second embodiment will be described, hereinafter. A suspension member for a vehicle of the second embodiment is a rear carrier (hereinafter, referred to as a carrier) assembled to the vehicle in a manner as to rotatably support a rear wheel (non-steered wheel). FIG. 6A is a front view of a carrier 50, and FIG. 6B is a side view of the carrier 50. Herein, in a state in which the carrier 50 is assembled to the vehicle, an inner side surface in the vehicle-width direction is defined to be a front view. Hence, the rear wheel is disposed on the right in FIG. 6B.

The carrier 50 includes a body part 60 rotatably supporting the rear wheel. The body part 60 is formed to have a circular hole 61 with a large diameter extending through a center portion of the body part 60. Around the circular hole 61, there are formed two bearing fastening holes 62 at an upper position and two bearing fastening holes 62 at a lower position from the circular hole 61. A not-illustrated hub bearing is installed in the circular hole 61, and not-illustrated bearing-fixing bolts are inserted through the bearing fastening holes 62 to be fastened, thereby installing the not-illustrated hub bearing in the circular hole 61. Through this configuration, the body part 60 rotatably supports an axle hub inserted through the circular hole 61 via the hub bearing.

In one side portion of the body part 60, there are formed caliper-fixing portions 63A, 63B used for fixing a not-illustrated brake caliper. A caliper-fixing hole 64 is formed in each of the caliper-fixing portions 63A, 63B, and respective not-illustrated caliper-fixing bolts are inserted through the caliper-fixing holes 64 so as to fix a brake caliper to the carrier 50.

Figure 7:
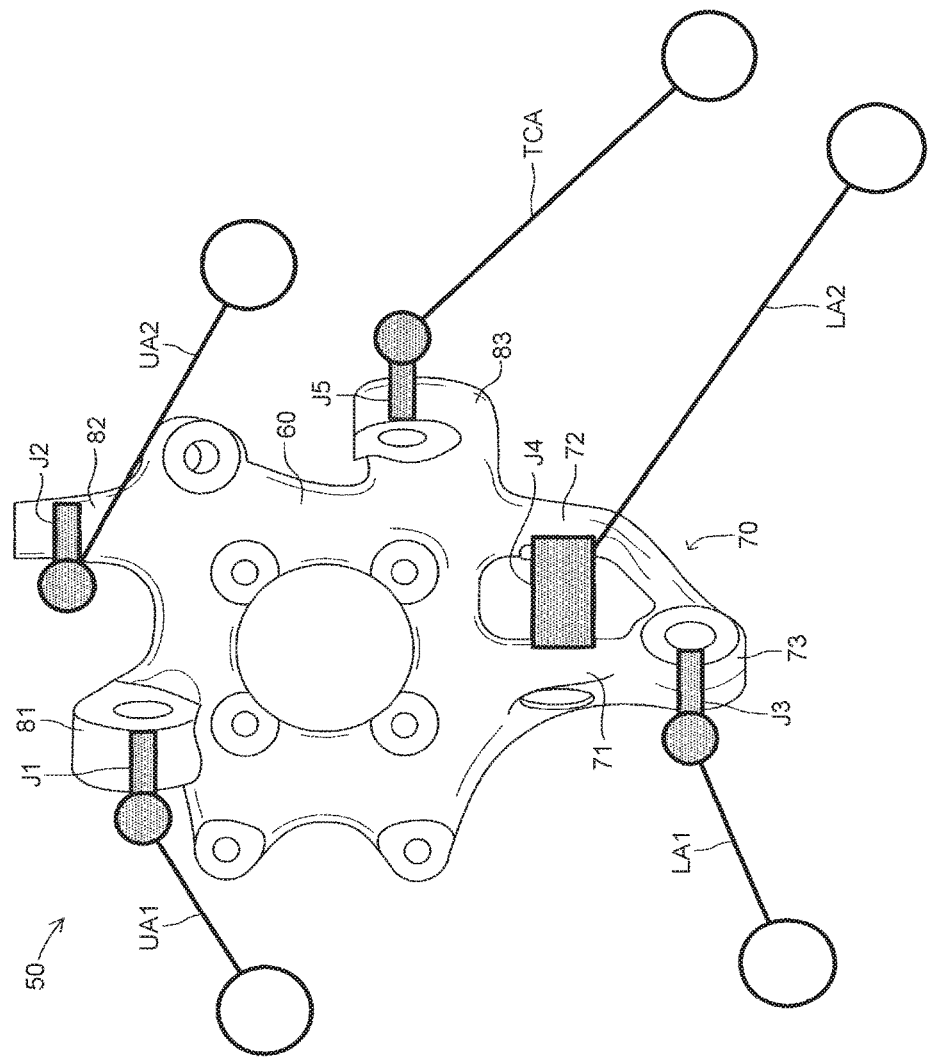
FIG. 7 is a front view of the carrier showing coupling relations thereof with other suspension members.
Figure 9A:
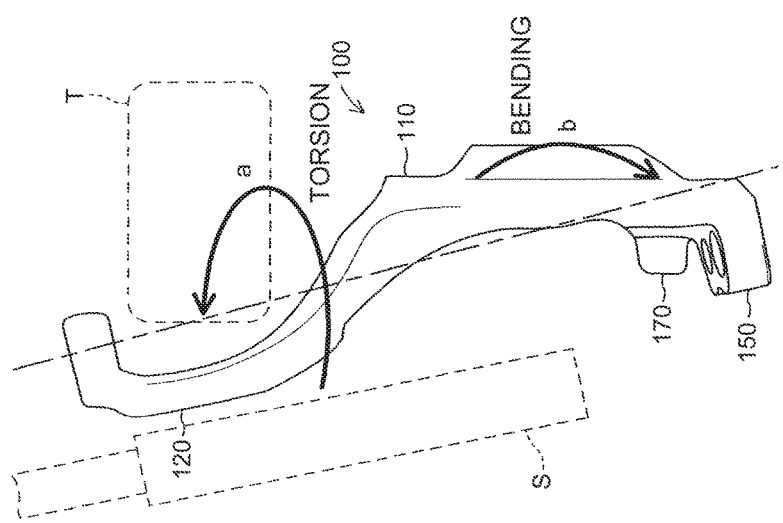
FIG. 9A is a front view of a knuckle of related art.
Figure 9B:
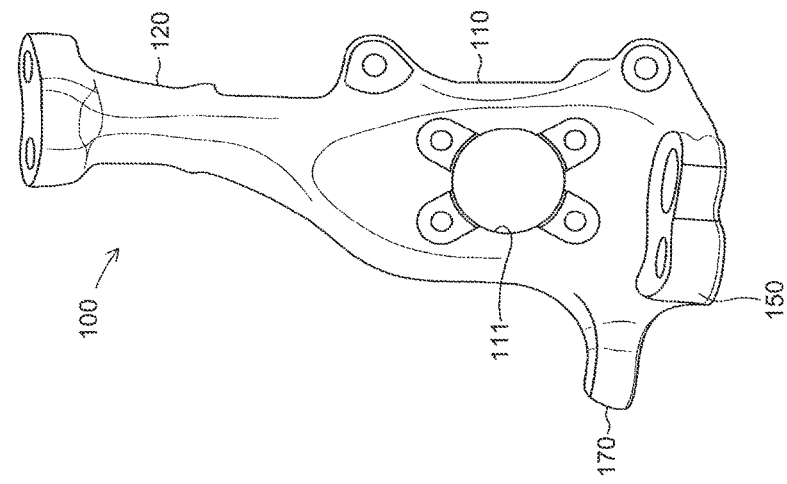
FIG. 9B is a side view of the knuckle of related art.
Figures 10A, 10B, 10C:
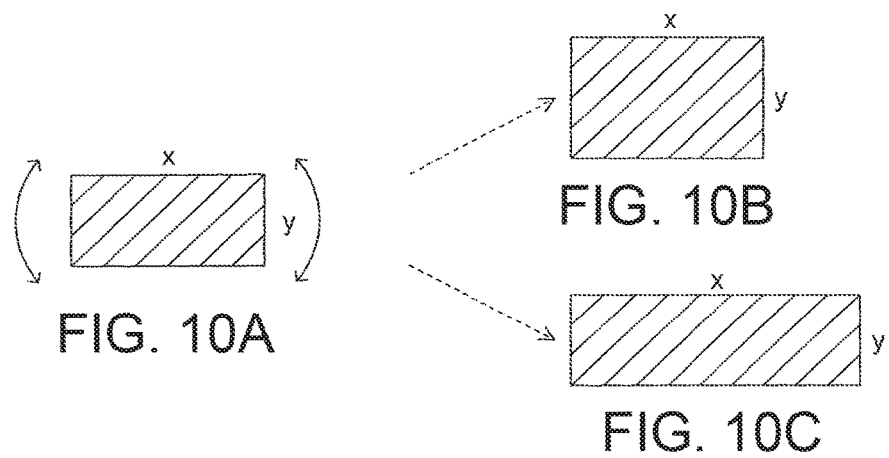
FIG. 10A is an explanatory drawing showing a common method to enhance a torsional rigidity.
FIG. 10B is an explanatory drawing showing the common method to enhance the torsional rigidity.
FIG. 10C is an explanatory drawing showing the common method to enhance the torsional rigidity.

An upper portion of the body part 60 is provided with a first upper-arm coupling portion 81 integrally extending in a vehicle-width inward direction from the body part 60, and a second upper-arm coupling portion 82 integrally extending upward from the body part 60. FIG. 7 is a drawing showing coupling relations between the carrier 50 and various suspension arms. A first upper-arm coupling hole 81a is so formed as to extend through the first upper-arm coupling portion 81 in the substantially vehicle longitudinal direction, and a first upper arm UA1 is coupled to the first upper-arm coupling portion 81 via a coupling member J1, such as a ball joint, inserted through the first upper-arm coupling hole 81a. A second upper-arm coupling hole 82a is so formed as to extend through the second upper-arm coupling portion 82 in the vehicle longitudinal direction, and a second upper arm UA2 is coupled to the second upper-arm coupling portion 82 via a coupling member J2, such as a ball joint, inserted through the second upper-arm coupling hole 82a.

A lower portion of the body part 60 is provide with a lower-arm coupling portion 70 integrally extending downward from the body part 60. The lower-arm coupling portion 70 is configured by a first leg portion 71 and a second leg portion 72 that integrally extend downward from the body part 60, and a front end portion 73 integrally connecting the first leg portion 71 and the second leg portion 72. A first lower-arm coupling hole 73a is so formed as to extend through the front end portion 73 in the substantially vehicle longitudinal direction, and a first lower arm LA1 is coupled to the front end portion 73 via a coupling member J3, such as a ball joint, inserted through the first lower-arm coupling hole 73a. Second lower-arm coupling holes 71a, 72a are so formed as to respectively extend through the first leg portion 71 and the second leg portion 72 in the vehicle longitudinal direction, and a second lower arm LA2 is coupled to the front end portion 73 via a coupling member J4, such as a bush, inserted through the second lower-arm coupling holes 71a, 72a.

A side portion of the body part 60 is provided with a toe-control-arm coupling portion 83 in a manner as to integrally extend from the body part 60 in the vehicle-width inward direction. A toe-control-arm coupling hole 83a is so formed as to extending through the toe-control-arm coupling portion 83 in the substantially vehicle longitudinal direction, and a toe-control arm TCA is coupled to the toe-control-arm coupling portion 83 via a coupling member J5, such as a ball joint, inserted through the toe-control-arm coupling hole 83a.

Accordingly, while rotatably supporting the axel hub, the carrier 50 is swingably coupled to the vehicle body via the two upper arms UA1, UA2, the two lower arms LA1, LA2, and the toe-control arm TCA. In this manner, the carrier 50 supports the rear wheel (non-steered wheel) in a rotatable manner, and in a swingable manner relative to the vehicle body.

As with the knuckle 1, the overall carrier 50 is formed by the random carbon-fiber composite material B, and the unidirectional carbon-fiber composite material A is embedded in portions whose rigidities are desired to be enhanced in consideration of directions in which the loads act. As shown in FIG. 8A, a torsional load acts from the coupling member J1 in an arrow a2 direction on a base portion 81x that is a base portion of the first upper-arm coupling portion 81 extending from the body part 60. A torsional load acts from the coupling member J2 in an arrow b2 direction on a base portion 82x that is a base portion of the second upper-arm coupling portion 82 extending from the body part 60. A torsional load acts from the coupling member J3 in an arrow c2 direction on base portions 71x, 72x that are base portions of the lower-arm coupling portion 70 extending from the body part 60. In this case, in the lower-arm coupling portion 70, the first leg portion 71 and the second leg portion 72 are portions that integrally connect the front end portion 73 into which the torsional load is inputted to the body part 60, and these first and second leg portions 71, 72 correspond to the base portions 71x, 72x, respectively. A torsional load in an arrow d2 direction acts from the coupling member J5 on a base portion 83x that is a base portion of the toe-control-arm coupling portion 83 extending from the body part 60 (see FIG. 8B).

Accordingly, the base portion 81x of the first upper-arm coupling portion 81 is set to be a particular portion P4 whose rigidity against the torsional load is desired to be enhanced; the base portion 82x of the second upper-arm coupling portion 82 is set to be a particular portion P5 whose rigidity against the torsional load is desired to be enhanced; the two base portions 71x, 72x of the lower-arm coupling portion 70 are set to be particular portions P6, P7 whose rigidity against the torsional load is desired to be enhanced; and the base portion 83x of the toe-control-arm coupling portion 83 is set to be a particular portion P8 whose rigidity against the torsional load is desired to be enhanced (see FIG. 8B).

The carrier 50 is formed by the random carbon-fiber composite material B as a whole, and in the particular portions P4, P5, P6, P7, P8, the unidirectional carbon-fiber composite material A is embedded such that the continuous fibers thereof are orientated in the direction substantially orthogonal to the central axis of each torsional load. In this example, the continuous fibers in the unidirectional carbon-fiber composite material A embedded in each of the particular portions P4, P5, P6, P7 is orientated in the vehicle longitudinal direction as shown in FIG. 8A. In addition, the continuous fibers in the unidirectional carbon-fiber composite material A embedded in particular portion P8 of the toe-control-arm coupling portion 83 is orientated in the vehicle-width direction, as shown in FIG. 8B.

As with the knuckle 1, since a lateral load is inputted into the wheel, a bending load in an arrow e2 direction acts on the body part 60 of the carrier 50, as shown in FIG. 8B. Therefore, portions of the body part 60 located more vehicle-frontward and more vehicle-rearward than the circular hole 61 are set to be the particular portions P9, P10 whose bending rigidity is desired to be enhanced (see FIG. 8A). In these particular portions P9, P10, the unidirectional carbon-fiber composite material A is embedded such that the continuous fibers thereof are orientated in a direction in which the rigidity against the bending load is enhanced, that is, in the vertical direction parallel with the bending neutral line.

This carrier may be formed by using random mats and UD sheets, as with the knuckle 1, for example.

Even if the carrier 50 as the aforementioned suspension member of the second embodiment has the multiple particular portions whose rigidities are required to be enhanced and directions in which the rigidities are desired to be enhanced are different from one another, the unidirectional carbon-fiber composite material A is embedded in these particular portions such that the continuous fibers thereof are orientated in consideration of the respective directions in which the rigidities of these particular portions are desired to be enhanced. Accordingly, the rigidity can be enhanced in a well balance through the entire carrier 50. It is unnecessary to secure the rigidity by a sectional shape of a metallic material, as it is necessary in the related art; therefore, it is possible to attain reduction in space and reduction in weight. Accordingly, freedom of designing is promoted.

As aforementioned, the respective suspension members for a vehicle of the two embodiments have been described, but the present disclosure is not limited to the aforementioned embodiments, and may be variously modified without departing from the scope of the present disclosure.

For example, in the present embodiments, applications to the knuckle 1 and the carrier 50 have been described, but the present disclosure may be applied to a suspension arm, such as an upper arm and a lower arm.

In addition, the knuckle 1 of the first embodiment is a type having the upper arm coupled to an upper end of the neck part 20, but may be a type having a shock absorber coupled to the upper end of the neck part 20, as similar to a strut-type suspension.

What is claimed is:

1. A knuckle for a vehicle, the knuckle comprising:
   a first carbon-fiber composite material including continuous fibers, an orientation of the continuous fibers being oriented in one direction; and
   a second carbon-fiber composite material including discontinuous fibers, an orientation of the discontinuous fibers being oriented in random directions,
   the knuckle integrally configured by the first carbon-fiber composite material and the second carbon-fiber composite material,
   the first carbon-fiber composite material being embedded in at least two different portions of the second carbon-fiber composite material such that the orientation of the continuous fibers in the at least two different portions are different from each other, wherein
   the knuckle is assembled to the vehicle such that the knuckle rotatably supports a steered wheel of the vehicle,
   the knuckle includes:
   a body part provided with a circular hole in which a hub bearing is installed, the circular hole disposed at a center portion of the body part, and
   a neck part integrally extending upward from the body part, an upper end of the neck part being coupled to another suspension member,
   and
   the first carbon-fiber composite material is provided to the neck part and the body part such that
   i) the orientation of the continuous fibers of the first carbon-fiber composite material provided to the body part is a vertical direction in a state in which the knuckle is assembled to the vehicle, and
   ii) the orientation of the continuous fibers of the first carbon-fiber composite material provided to the neck part is a direction orthogonal To the vertical direction.

* * * * *